US008657682B2

(12) United States Patent
Lai

(10) Patent No.: US 8,657,682 B2
(45) Date of Patent: Feb. 25, 2014

(54) MOTION SENSING CONTROLLER AND GAME APPARATUS HAVING SAME

(75) Inventor: Cheng-Yi Lai, Taipei-Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 1060 days.

(21) Appl. No.: 12/698,222

(22) Filed: Feb. 2, 2010

(65) Prior Publication Data

US 2011/0068937 A1   Mar. 24, 2011

(30) Foreign Application Priority Data

Sep. 21, 2009   (CN) .......................... 2009 1 0307396

(51) Int. Cl.
*A63F 13/00*   (2006.01)

(52) U.S. Cl.
USPC .......................................................... 463/36

(58) Field of Classification Search
USPC .......................................... 463/31, 35, 36, 38
See application file for complete search history.

(56) References Cited

U.S. PATENT DOCUMENTS

| 4,736,640 | A  | * | 4/1988  | Hooks ........................... 73/866.1 |
| 5,741,182 | A  | * | 4/1998  | Lipps et al. ....................... 463/36 |
| 6,162,123 | A  | * | 12/2000 | Woolston ......................... 463/37 |
| 7,445,550 | B2 | * | 11/2008 | Barney et al. .................... 463/37 |
| 8,164,567 | B1 | * | 4/2012  | Barney et al. ................... 345/158 |
| 8,169,406 | B2 | * | 5/2012  | Barney et al. ................... 345/158 |
| 8,179,366 | B2 | * | 5/2012  | Richardson et al. .......... 345/156 |
| 2005/0009605 | A1 | | 1/2005 | Rosenberg et al. |
| 2006/0252541 | A1 | * | 11/2006 | Zalewski et al. ................ 463/36 |
| 2007/0252815 | A1 | * | 11/2007 | Kuo et al. ...................... 345/158 |
| 2008/0261693 | A1 | * | 10/2008 | Zalewski ......................... 463/31 |
| 2009/0017910 | A1 | * | 1/2009 | Rofougaran et al. ........... 463/36 |
| 2010/0105480 | A1 | * | 4/2010 | Mikhailov et al. .............. 463/38 |

FOREIGN PATENT DOCUMENTS

| CN | 101464132 A | 6/2009 |
| CN | 101496033 A | 7/2009 |
| EP | 0766810 B1 | 4/1997 |
| WO | 2009/075330 A1 | 6/2009 |
| WO | 2009/113484 A1 | 9/2009 |

* cited by examiner

*Primary Examiner* — William Brewster
*Assistant Examiner* — Ryan Hsu
(74) *Attorney, Agent, or Firm* — Altis Law Group, Inc.

(57) ABSTRACT

An exemplary motion sensing controller includes an infrared light detection module, a spherical light output member, and a processing unit. The infrared light detection module is configured for detecting infrared light and includes a lens module. The spherical light output member is configured for outputting infrared light. The infrared light detection module has a sensing surface configured for capturing images of the spherical light output member. The processing unit is electrically connected with the infrared light detection module. The processing unit is configured for receiving signals of the images of the spherical light output member, computing dimensions and positions of the images of the spherical light output member on the sensing surface, and computing positions of the spherical light output member with respect to the lens module based on the dimensions and the positions of the images of the spherical light output member on the sensing surface.

10 Claims, 5 Drawing Sheets

MOTION SENSING CONTROLLER AND GAME APPARATUS HAVING SAME

BACKGROUND

1. Technical Field

The present disclosure relates to a motion sensing controller and a game apparatus having such motion sensing controller.

2. Description of Related Art

Video games are well known in the art and have been developed in a variety of forms. A game apparatus generally includes a host in communication with a display, such as a monitor or a home-use TV receiver, and a game controller in communication with the host, for performing various playing operations.

A game apparatus is disclosed in the U.S. Pub. No. 2008/0015031. This game apparatus is comprised of two infrared light sources in the vicinity of a display screen, and a wireless game controller. The game controller includes an imaging element and an image processing circuit electrically connected to the imaging element therein. The imaging element is configured for capturing images of the two infrared light sources. The image processing circuit is configured for processing the images to calculate positions of the game controller, thus obtaining three-dimensional motions of the game controller. The game controller can be used in various simulated games. However, in this game apparatus, at least two infrared light sources must be provided. This complicates the game apparatus.

Therefore, a motion sensing controller and a game apparatus using the same are needed to overcome the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Various embodiments will now be described in detail below with reference to the drawings.

Figure 1:
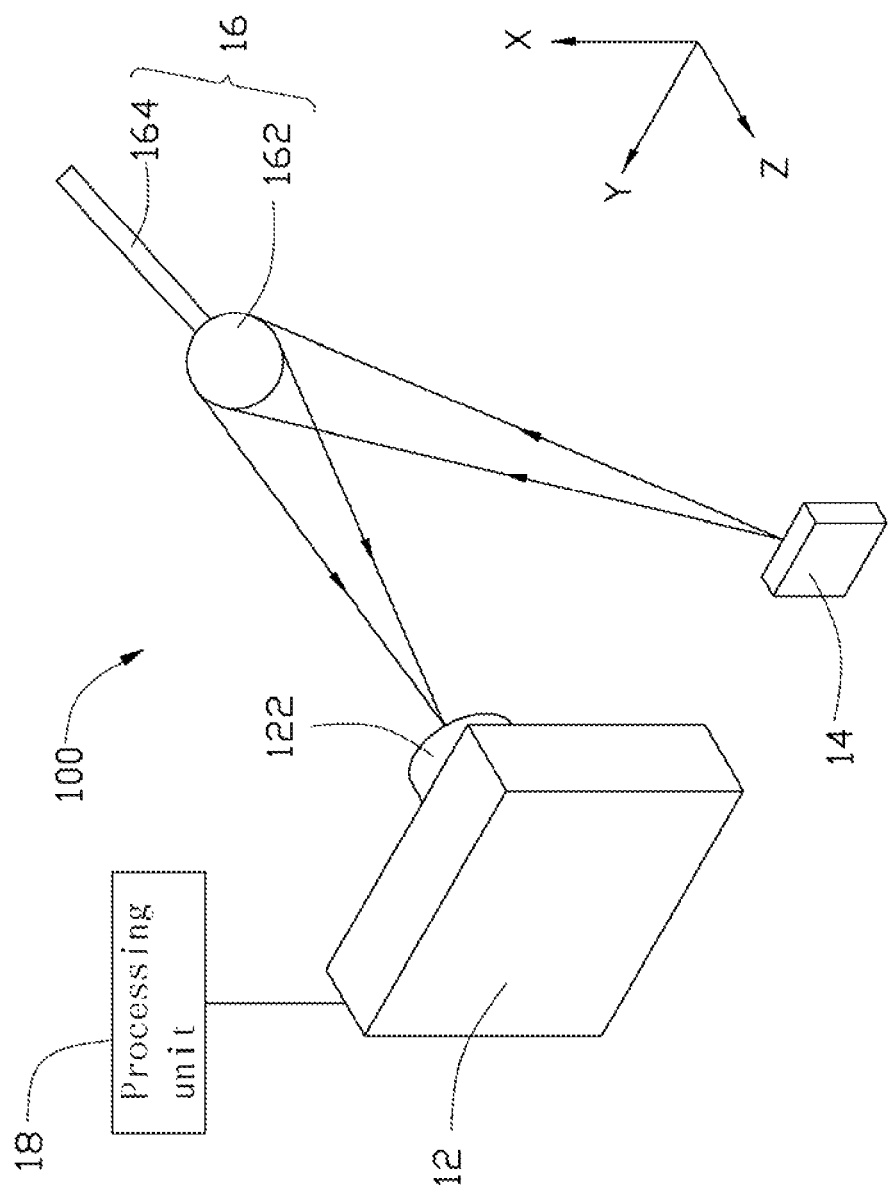
FIG. 1 is an isometric view of a motion sensing controller in accordance with a first exemplary embodiment.

Referring to FIG. 1, a motion sensing controller 100 in accordance with a first exemplary embodiment includes an infrared (IR) light detection module 12, an IR light source 14, a detected member 16, and a processing unit 18.

The IR light detection module 12 includes a lens module 122 for collecting ambient IR light, and an IR light sensor for detecting the IR light. The IR light sensor may be a CCD sensor or a CMOS sensor, and includes an array of sensor units.

The IR light source 14 is positioned adjacent to the IR light detection module 12. The IR light source 14 can be an IR light emitting diode.

The detected member 16 is configured for reflecting light emitted from the IR light source 14 to the IR light detection module 12. The detected member 16 includes a spherical reflector 162 and a holding bar 164 connected to the spherical reflector 162. An outer surface of the spherical reflector 162 is a light-scattering surface, such as a rough surface, such that the entire outline of the spherical reflector 162 can be captured by the detected member 16. That is, images formed in the two-dimensional IR light sensor have round shapes corresponding to the outline of the spherical reflector 162.

The holding bar 164 is cylindrical and has a rough outer surface convenient for gripping. The holding bar 164 can be comprised of light-absorbing material, thereby preventing reflection of the IR light emitted from the IR light source 14 to the detected member 16. Preferably, the holding bar 164 has a round cross-section with a diameter less than that of the spherical reflector 162. For example, the diameter of the holding bar 164 can be one tenth to one third of the diameter of the spherical reflector 162. It is to be understood that the holding bar 164 can also be prismatic or in other shape.

Figure 2:
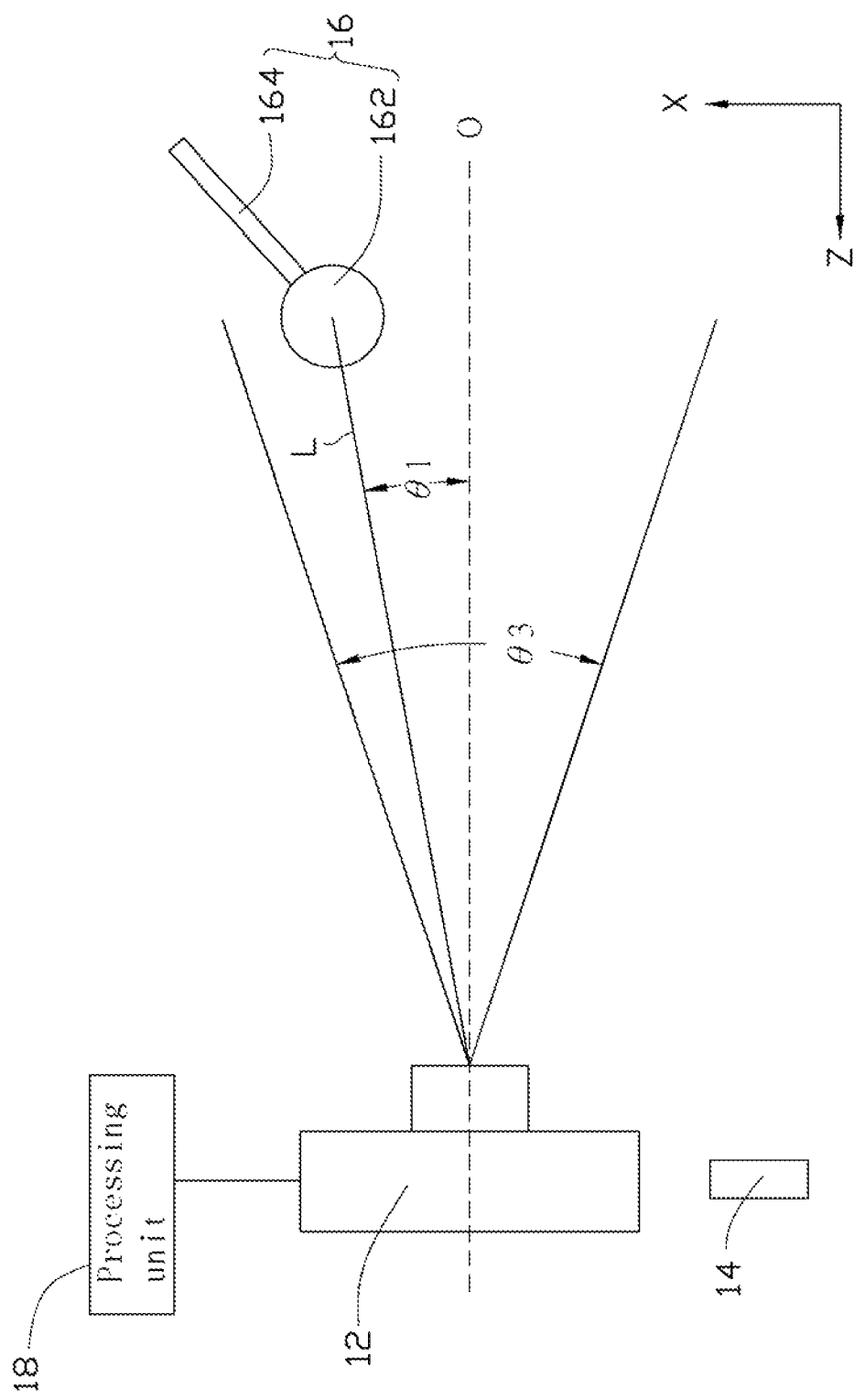
FIG. 2 is a right side view of the motion sensing controller of FIG. 1, showing a process of detecting a position of an object using the motion sensing controller.
Figure 3:
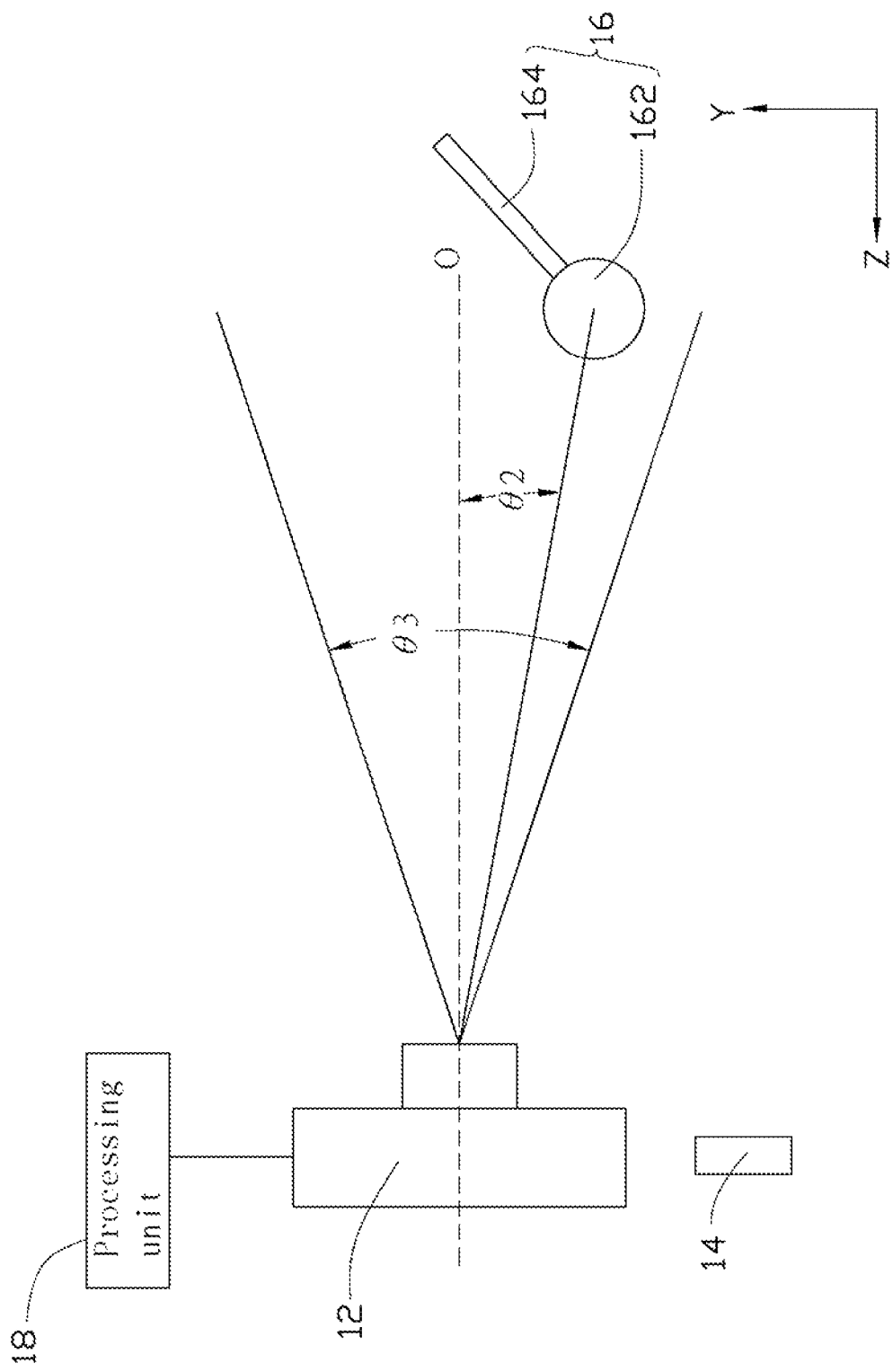
FIG. 3 is a top view of the motion sensing controller of FIG. 1, showing a process of detecting a position of an object using the motion sensing controller.

The processing unit 18 is electrically connected to the IR light detection module 12. A three-dimension coordinate system X-Y-Z is defined. The X axis is perpendicular to the Y axis and both of the X and Y axes are parallel to the two-dimensional sensor of the IR light detection module 12. The Z axis is perpendicular to the X and Y axes. Referring to FIGS. 2 and 3, in use, the detected member 16 is in view of the IR light detection module 12 and the IR source 14. A straight line L is defined by connecting the center of the spherical reflector 162 with the lens module 122. A first included angle θ1 is formed between a projection of the straight line L onto the plane X-Z and a principal axis O of the lens module 122, wherein the principal axis O is parallel to the Z axis. A second included angle θ2 is formed between a projection of the straight line L onto the plane Y-Z and the principal axis O of the lens module 122. The first included angle θ1 and the second included angle θ2 can be computed by the processing unit 18.

When the detected member 16 moves away from the IR light detection module 12, the dimension of the image of the spherical reflector 162 on the IR light sensor of the IR light detection module 12 become smaller. The distance between the spherical reflector 162 and the IR light detection module 12 and the dimension of the image of the spherical reflector 162 have a corresponding relationship. The processing unit 18 stores information about the corresponding relation between the dimension of the image of the spherical reflector 162 and the distance between the lens module 122 and the spherical reflector 162. Thus, the distance between the lens module 122 and the spherical reflector 162 can be obtained according to the dimension of the image of the spherical reflector 162. Based on the first included angle θ1, the second included angle θ2, and the distance between the lens module 122 and the spherical reflector 162, the processing unit 18 can compute the position of the spherical reflector 162 with respect to the IR light detection module 12.

Referring to FIGS. 1 and 2, a process for detecting a position of an object using the motion sensing controller 100 follows. The spherical reflector 162 is positioned facing the lens module 122. In the present embodiment, the resolution of the IR light sensor of the IR light detection module 12 is 640×480. That is, the number of the sensor unit of the IR light detection module 12 is 640 rows by 480 columns A width of the sensor unit is two microns. As shown in FIG. 2, in the present embodiment, the viewing field angle θ3 of the IR light detection module 12 is 53.13°.

Referring to FIG. 2, the IR light source 14 emits IR light to the spherical reflector 162. The spherical reflector 162 reflects the IR light to the IR light detection module 12, thereby obtaining an image of the spherical reflector 162. Viewed from any angle, the outline of a spherical reflector 162 is round with equal dimensions. The IR light sensor of the IR light detection module 12 is at a millimeter level. A distance between the lens module 122 of the IR light detection module 12 and the spherical reflector 162 far exceeds the dimension of the IR light sensor of the IR light detection module. Thus, the image of the spherical reflector 162 has a substantially round shape corresponding to the region bound by the outline of the spherical reflector 162. For example, when the distance between the spherical reflector 162 and the lens module 122 exceeds one meter, the images of the spherical reflector 162 are approximately round.

The processing unit 18 computes the first included angle θ1 and the second angle as described based on the position of the round image on the IR light sensor with respect to the center of the IR light sensor using algorithms known in the art.

The processing unit 18 provides the distance between the spherical reflector 162 and the lens module 122 according to the information of the corresponding relationship between the dimension of the image of the spherical reflector 162 and the distance between the lens module 122 and the spherical reflector 162 stored in the processing unit 18. In this embodiment, the dimensions of the image of the spherical reflector 162 are represented by the number of the sensor units corresponding to the image of the spherical reflector 162. A distance error between the computed distance and the true distance between the lens module 122 and the spherical reflector 162 reduces as the spherical reflector 162 moves toward the lens module 122. For example, if the diameter of the spherical reflector 162 is assumed to be 3 cm, and the number of sensor units corresponding to the image of the spherical reflector 162 is eight, the stored corresponding distance between the spherical reflector 162 and the lens module 122 equals 3 m. When the distance the number of sensor units corresponding to the image of the spherical reflector 162 is nine, the stored corresponding distance between the spherical reflector 162 and the lens module 122 equals 2.7 m. Here the distance error between the computed distance and the true distance is 0.3 m. When the true distance is reduced, the distance error is also reduced.

Finally, the processing unit 18 computes the position of the spherical reflector 162 with respect to the IR light detection module 12 based on the first included angle θ1, the second included angle θ2, and distance between the spherical reflector 162 and the lens module 122. Thus, positions of the spherical reflector 162 with respect to the lens module 122 can be detected. Therefore, the three-dimensional motion of the spherical reflector 162 can be obtained by capturing images of the spherical reflector 162 continuously.

Figure 4:
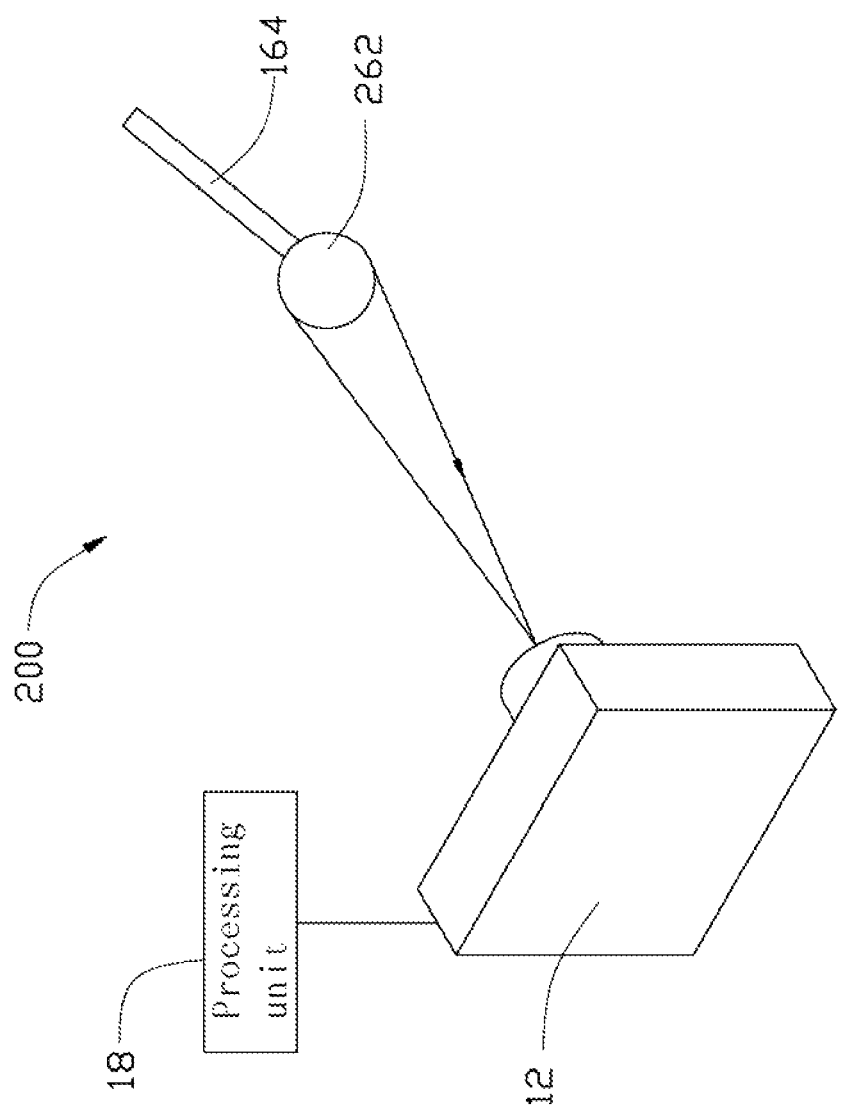
FIG. 4 is an isometric view of a motion sensing controller in accordance with a second exemplary embodiment.

Referring to FIG. 4, a motion sensing controller 200 in accordance with a second exemplary embodiment is provided. The motion sensing controller 200 differs from the motion sensing controller 100 in that a spherical IR light source 262 replaces the spherical reflector 162 of the first exemplary embodiment. In this embodiment, the IR light source 14 is omitted. Light emitted from the spherical IR light source 262 is directly transmitted to the lens module 122. The process for detecting positions of the spherical IR light source 262 is similar to that of the first exemplary embodiment.

Figure 5:
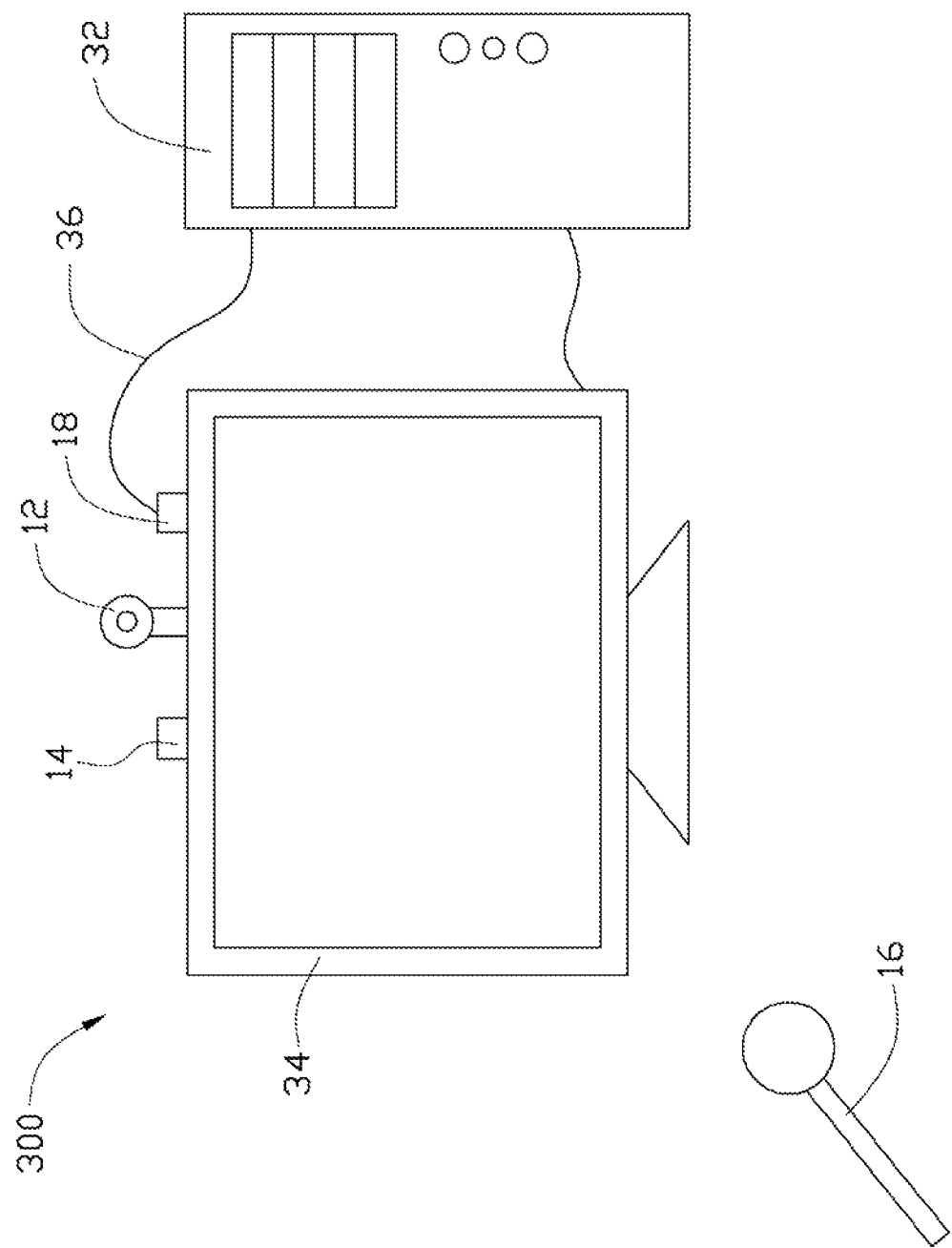
FIG. 5 is an isometric view of a game apparatus as disclosed.

Referring to FIG. 5, a game apparatus 300 is provided. The game apparatus 300 includes a motion sensing controller 100, such as that of FIG. 1, a host 32 and a display screen 34. The host 32 is electrically connected with the processing unit 18 via a cable 36. During movement of the spherical reflector 162, the processing unit 18 computes position changes and provides signals thereof to the host 32. Thus, three-dimensional motions of the spherical reflector 162 are obtained. The host 32 can generate instructions based on the position changes of the spherical reflector 162. The display screen 34 is configured for displaying game contents stored in the host 32. It is to be understood that the apparatus is equally applicable using motion sensing controllers such as, for example, those in the second exemplary embodiment. In addition, the processing unit 18 can also be received in the player host 32.

In the exemplary embodiments, the motion sensing controller includes only one spherical reflector 162 for reflecting infrared light or only one spherical infrared light source 262. Thus the structure of the controller is simplified.

Finally, it is to be understood that the embodiments are intended to illustrate rather than limit the disclosure. Variations may be made to the embodiments without departing from the spirit of the disclosure. The above-described embodiments illustrate the scope of the disclosure but do not restrict the scope of the disclosure.

The invention claimed is:

1. A motion sensing controller, comprising:
   an infrared light source configured for emitting infrared light;
   an infrared light detection module for detecting the infrared light, the infrared light detection module comprising a lens module;
   a spherical infrared reflector comprising an outer surface, the infrared light emitted by the infrared light source emitting to the outer surface of the spherical infrared reflector and then reflected to the infrared light detection module by the spherical infrared reflector; and
   a processing unit electrically connected with the infrared light detection module, the processing unit configured for receiving signals of the images of the spherical infrared reflector from the infrared light detection module, computing dimensions and positions of the images of the spherical infrared reflector on the sensing surface, and computing positions of the spherical infrared reflector with respect to the lens module based on the dimensions and the positions of the images of the spherical infrared reflector on the sensing surface, wherein a three-dimension coordinate system X-Y-Z is defined, the X axis is perpendicular to the Y axis and both of the X and Y axes are parallel to the two-dimensional sensor of the infrared light detection module, the Z axis is perpendicular to the X and Y axes, the spherical infrared reflector is in view of the infrared light detection module and the infrared source, a straight line L is defined by connecting the center of the spherical reflector with the lens module, a first included angle θ1 is formed between a projection of the straight line L onto the plane X-Z and a principal axis of the lens module, wherein the principal axis is parallel to the Z axis, a second included angle θ2 is formed between a projection of the straight line L onto the plane Y-Z and the principal axis of the lens module, the first included angle θ1 and the second included angle θ2 is computed by the processing unit, a distance between the spherical reflector and the infrared light detection module and the dimension of the image of the spherical reflector have a corresponding relationship, the processing unit stores information about the corresponding relation between the dimension of the image of the spherical reflector and the distance between the lens module and the spherical reflector, the distance between the lens module and the spherical reflector is capable of being obtained according to the dimension of the image of the spherical reflector, based on the first included angle θ1, the second included angle θ2, the processing unit computes the position of the spherical reflector with respect to the infrared light detection module.

2. The motion sensing controller of claim 1, wherein the outer surface is a light-scattering surface.

3. The motion sensing controller of claim 2, further comprising a holding bar, one end of which is connected with the spherical reflector and is configured for gripping.

4. The motion sensing controller of claim 3, wherein the holding bar is comprised of light-absorbing material.

5. The motion sensing controller of claim 3, wherein the holding bar is cylindrical with a round cross section of a diameter one tenth to one third that of the spherical reflector.

6. A game apparatus, comprising:
   a motion sensing controller, comprising:
      an infrared light source configured for emitting infrared light;
      an infrared light detection module for detecting the infrared light, the infrared light detection module comprising a lens module;
      a spherical infrared reflector comprising an outer surface, the infrared light emitted by the infrared light source emitting to the outer surface of the spherical infrared reflector and then reflected to the infrared light detection module by the spherical infrared reflector; and
   a processing unit electrically connected with the infrared light detection module, the processing unit configured for receiving signals of the images of the spherical infrared reflector from the infrared light detection module, computing dimensions and positions of the images of the spherical infrared reflector on the sensing surface, and computing positions of the spherical infrared reflector with respect to the lens module based on the dimensions and the positions of the images of the spherical infrared reflector on the sensing surface; and
   a display screen electrically connected with the host, configured for displaying game contents stored in the host, wherein a three-dimension coordinate system X-Y-Z is defined, the X axis is perpendicular to the Y axis and both of the X and Y axes are parallel to the two-dimensional sensor of the infrared light detection module, the Z axis is perpendicular to the X and Y axes, the spherical infrared reflector is in view of the infrared light detection module and the infrared source, a straight line L is defined by connecting the center of the spherical reflector with the lens module, a first included angle θ1 is formed between a projection of the straight line L onto the plane X-Z and a principal axis of the lens module, wherein the principal axis is parallel to the Z axis, a second included angle θ2 is formed between a projection of the straight line L onto the plane Y-Z and the principal axis of the lens module, the first included angle θ1 and the second included angle θ2 is computed by the processing unit, a distance between the spherical reflector and the infrared light detection module and the dimension of the image of the spherical reflector have a corresponding relationship, the processing unit stores information about the corresponding relation between the dimension of the image of the spherical reflector and the distance between the lens module and the spherical reflector, the distance between the lens module and the spherical reflector is capable of being obtained according to the dimension of the image of the spherical reflector, based on the first included angle θ1, the second included angle θ2, the processing unit computes the position of the spherical reflector with respect to the infrared light detection module.

7. The game apparatus of claim 6, wherein the outer surface of the spherical infrared reflector is a light-scattering surface.

8. The game apparatus of claim 7, wherein the motion sensing controller further comprises a holding bar, one end of which is connected with the spherical reflector, and is configured for gripping.

9. The game apparatus of claim 8, wherein the holding bar is comprised of a light-absorbing material.

10. The game apparatus of claim 8, wherein the holding bar is cylindrical with a round cross section of a diameter one third to one tenth that of the spherical reflector.

* * * * *